United States Patent
Goldshmidt et al.

(10) Patent No.: US 12,321,456 B2
(45) Date of Patent: *Jun. 3, 2025

(54) AUTOMATIC GENERATION OF MALWARE DETECTION TRAPS

(71) Applicant: Commvault Systems, Inc., Tinton Falls, NJ (US)

(72) Inventors: Oleg Goldshmidt, Herzliya (IL); Mori Benech, Tel-Aviv (IL)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,835

(22) Filed: Jun. 6, 2024

(65) Prior Publication Data

US 2024/0320339 A1 Sep. 26, 2024

Related U.S. Application Data

(63) Continuation of application No. 18/140,511, filed on Apr. 27, 2023, now Pat. No. 12,039,048, which is a
(Continued)

(51) Int. Cl.
*G06F 21/56* (2013.01)
*G06F 21/51* (2013.01)
(Continued)

(52) U.S. Cl.
CPC .......... *G06F 21/566* (2013.01); *G06F 21/51* (2013.01); *G06F 21/554* (2013.01);
(Continued)

(58) Field of Classification Search
CPC ...... G06F 21/566; G06F 21/51; G06F 21/554; G06F 21/577; G06F 2221/034;
(Continued)

(56) References Cited

U.S. PATENT DOCUMENTS 7,600,160 B1  10/2009 Lovy et al.
7,779,472 B1  8/2010 Lou
(Continued)

FOREIGN PATENT DOCUMENTS

WO  WO-2020054818 A1 *  3/2020 ......... H04L 63/1416

OTHER PUBLICATIONS

PCT Search Report for PCT/IL2015/050398, dated Sep. 24, 2015, 08 Pages.

*Primary Examiner* — Christopher A Revak
(74) *Attorney, Agent, or Firm* — Commvault Systems, Inc.

(57) ABSTRACT

A system and method of deployment of malware detection traps by at least one processor may include performing a first interrogation of a first Network Asset (NA) of a specific NA family; determining, based on the interrogation, a value of one or more first NA property data elements of the first NA; obtaining one or more second NA property data elements corresponding to the specific NA family; integrating the one or more first NA property data elements and the one or more second NA property data elements to generate a template data element, corresponding to the specific NA family; producing, from the template data element, a malware detection trap module; and deploying, on one or more computing devices of a computer network, one or more instantiations of the malware detection trap module as decoys of the first NA.

20 Claims, 5 Drawing Sheets

Related U.S. Application Data continuation of application No. 17/137,384, filed on Dec. 30, 2020, now Pat. No. 11,681,804.

(60) Provisional application No. 62/986,838, filed on Mar. 9, 2020.

(51) Int. Cl.
  *G06F 21/55* (2013.01)
  *G06F 21/57* (2013.01)

(52) U.S. Cl.
  CPC ...... *G06F 21/577* (2013.01); *G06F 2221/034* (2013.01); *G06F 2221/2125* (2013.01)

(58) Field of Classification Search
  CPC ..... G06F 2221/2125; G06F 2221/2127; G06F 21/55; H04L 63/1491
  See application file for complete search history.

(56) References Cited

U.S. PATENT DOCUMENTS

| | | | |
|---|---|---|---|
| 8,307,432 B1 | 11/2012 | Feng | |
| 8,370,938 B1 | 2/2013 | Daswani et al. | |
| 8,510,838 B1* | 8/2013 | Sun | G06F 21/566 713/181 |
| 8,516,590 B1 | 8/2013 | Ranadive et al. | |
| 8,539,578 B1 | 9/2013 | Zhou et al. | |
| 8,555,391 B1 | 10/2013 | Demir et al. | |
| 8,683,584 B1 | 3/2014 | Daswani et al. | |
| 8,789,174 B1 | 7/2014 | Gupta | |
| 8,806,647 B1* | 8/2014 | Daswani | G06V 40/11 713/168 |
| 8,832,829 B2 | 9/2014 | Manni et al. | |
| 8,839,417 B1 | 9/2014 | Jordan | |
| 8,839,433 B2 | 9/2014 | O'Reirdan et al. | |
| 8,863,288 B1 | 10/2014 | Savage et al. | |
| 8,990,945 B1 | 3/2015 | Ranadive et al. | |
| 9,202,054 B1 | 12/2015 | Lu et al. | |
| 9,516,054 B2 | 12/2016 | Malachi | |
| 9,672,355 B2 | 6/2017 | Titonis et al. | |
| 9,807,114 B2 | 10/2017 | Kolton et al. | |
| 9,858,416 B2 | 1/2018 | Niemelä et al. | |
| 9,882,929 B1 | 1/2018 | Ettema et al. | |
| 10,275,595 B2 | 4/2019 | Malachi et al. | |
| 10,372,908 B2 | 8/2019 | Malachi et al. | |
| 10,375,576 B1 | 8/2019 | Wu et al. | |
| 10,452,817 B1 | 10/2019 | Mingyan et al. | |
| 11,232,193 B1 | 1/2022 | Raber | |
| 11,681,804 B2 | 6/2023 | Goldshmidt et al. | |
| 12,039,048 B2* | 7/2024 | Goldshmidt | G06F 21/554 |
| 2004/0254906 A1 | 12/2004 | Shei et al. | |
| 2006/0026584 A1 | 2/2006 | Muratori et al. | |
| 2006/0190529 A1 | 8/2006 | Morozumi et al. | |
| 2006/0212723 A1 | 9/2006 | Sheymov | |
| 2006/0265517 A1 | 11/2006 | Hashimoto et al. | |
| 2008/0016314 A1 | 1/2008 | Li et al. | |
| 2009/0077666 A1 | 3/2009 | Chen et al. | |
| 2009/0241190 A1 | 9/2009 | Todd et al. | |
| 2009/0241191 A1 | 9/2009 | Keromytis et al. | |
| 2009/0254726 A1 | 10/2009 | Miller et al. | |
| 2010/0031353 A1 | 2/2010 | Thomas et al. | |
| 2010/0077476 A1 | 3/2010 | Adams | |
| 2011/0214182 A1 | 9/2011 | Adams et al. | |
| 2011/0225655 A1 | 9/2011 | Niemelä et al. | |
| 2011/0283252 A1 | 11/2011 | Chen et al. | |
| 2012/0041752 A1 | 2/2012 | Wang et al. | |
| 2012/0047576 A1 | 2/2012 | Do et al. | |
| 2012/0096539 A1 | 4/2012 | Hu et al. | |
| 2012/0180132 A1 | 7/2012 | Wu | |
| 2012/0240236 A1 | 9/2012 | Wyatt et al. | |
| 2012/0266243 A1 | 10/2012 | Turkulainen | |
| 2013/0097706 A1 | 4/2013 | Titonis et al. | |
| 2013/0117848 A1 | 5/2013 | Golshan et al. | |
| 2013/0326636 A1 | 12/2013 | Prchal et al. | |
| 2014/0082694 A1 | 3/2014 | Sanghavi | |
| 2014/0096250 A1 | 4/2014 | Belov | |
| 2014/0130161 A1 | 5/2014 | Golovanov | |
| 2014/0181976 A1 | 6/2014 | Snow et al. | |
| 2014/0282630 A1 | 9/2014 | Charles | |
| 2014/0283076 A1 | 9/2014 | Muttik | |
| 2014/0304797 A1 | 10/2014 | Fu et al. | |
| 2015/0096022 A1 | 4/2015 | Vincent et al. | |
| 2015/0326592 A1 | 11/2015 | Vissamsetty et al. | |
| 2015/0373043 A1 | 12/2015 | Wang et al. | |
| 2016/0021121 A1 | 1/2016 | Cui et al. | |
| 2016/0099963 A1* | 4/2016 | Mahaffey | H04L 63/166 726/25 |
| 2016/0196425 A1 | 7/2016 | Davidov et al. | |
| 2016/0261631 A1 | 9/2016 | Vissamsetty et al. | |
| 2016/0283716 A1 | 9/2016 | Momot | |
| 2016/0381043 A1 | 12/2016 | Yamada et al. | |
| 2016/0381054 A1 | 12/2016 | Agaian et al. | |
| 2017/0161498 A1 | 6/2017 | Yavo | |
| 2017/0185774 A1 | 6/2017 | Sahita et al. | |
| 2017/0243000 A1 | 8/2017 | Shraim et al. | |
| 2017/0357805 A1 | 12/2017 | Soeder | |
| 2018/0375897 A1 | 12/2018 | Kawasaki et al. | |
| 2019/0020683 A1* | 1/2019 | Haerterich | H04L 63/1491 |
| 2019/0379696 A1 | 12/2019 | Ludwig et al. | |
| 2021/0279332 A1 | 9/2021 | Goldschmidt et al. | |
| 2023/0333834 A1* | 10/2023 | Sethi | G06F 8/65 |
| 2024/0056482 A1* | 2/2024 | Ignatius | H04L 63/1433 |

\* cited by examiner

AUTOMATIC GENERATION OF MALWARE DETECTION TRAPS

CROSS-REFERENCE TO RELATED APPLICATIONS

This application is a Continuation of U.S. patent application Ser. No. 18/140,511 filed on 27 Apr. 2023, which is a Continuation of U.S. patent application Ser. No. 17/137,384 filed on 30 Dec. 2020 (now U.S. Pat. No. 11,681,804), which claims the benefit of priority to U.S. Provisional Patent Application No. 62/986,838 filed on 9 Mar. 2020, all of which are hereby incorporated by reference in their entirety herein.

FIELD OF THE INVENTION

The present invention relates generally to the field of computer security. More specifically, the present invention relates to automatic generation of malware detection traps.

BACKGROUND OF THE INVENTION

Systems and methods for preventing cyber threats against computing devices and computer networks are ubiquitous. For example antivirus software may detect computer viruses and firewalls may prevent access to protected systems. However, common systems and methods suffer from a number of drawbacks. For example, an antivirus software may only detect a virus or malware when performing a scan of a computer, e.g., once a day and may not detect a malware in a system in real-time. In another example, an antivirus generally operates based on predefined signatures of malware and therefore may not be suitable for identification of new malwares.

In yet another example, firewall security software may typically operate based on a predefined configuration of opened ports. Thus, in a condition that the configuration is erroneous, changed or compromised, such firewall security software may not be capable of preventing malware from accessing a system using open or non-blocked ports. Firewall security configurations may be compromised, for example, by erroneous configuration and/or by erroneous or malicious action taken by a user or a perpetrator from within the security perimeter (e.g., from within a secured organizational network), such as clicking a malicious link in an email, using a compromised hardware device (e.g., a tainted USB memory key), etc.

An alternative approach for preventing cyber threats against computing networks and assets may include deployment of fake assets (e.g., fake devices) within the computing network (e.g., an organizational network), to serve as decoys or traps against a malware software or a user thereof.

The terms 'decoy' and 'trap' may be used herein interchangeably, to indicate an element (e.g., a software module) that may be configured to (a) obfuscate a user or a perpetrator (or an application thereof) into believing that the element is in fact a genuine network asset; (b) draw the perpetrator's attention or move them into action, such as to interact with or access the entity; and/or (c) identify the perpetrator's action as one originating from an unauthorized or malicious source.

Such approaches may detect malicious activity by luring a perpetrator into communicating with a fake asset. It may be appreciated that substantially only transactions that originate from malicious software and/or users thereof may be captured by such traps. That is because legitimate users (e.g., members or employees in the organization) may be oblivious to the fake assets and may not be expected to access or try to with them. In addition, traps based on fake assets may limit the freedom of operation of a perpetrator within a protected environment. For example, a perpetrator may be limited to performing a single mistake, such as a single attempt to access a fake asset before they may be identified as an unauthorized entity.

Currently available methods and systems for preventing cyber threats that employ the fake assets approach may scan a computer network, such as an organizational network to find or discover one or more network assets that are connected to or associated with the scanned network. Said scan may be performed passively, e.g., by listening to, or 'sniffing' (as commonly referred to in the art) data packets that may be transferred via the network. Alternatively, the scan may be performed actively, e.g., by actively transmitting one or more data packets and receiving and analyzing a response from one or more genuine network assets.

Currently available systems may produce an inventory list of assets (e.g., computing devices and/or services) that are connected to or associated with the organizational network. Currently available systems may subsequently deploy one or more fake assets based on the inventory list (e.g., following dynamic changes in the inventory) or based on a user input.

For example, currently available systems may scan an organizational network to discover a genuine or real network asset (e.g., a real printer) that may be installed therein, and may subsequently deploy one or more fake network assets (e.g., fake representations of printers) that may correspond to, or be of the same type (e.g., a printer, in this example) as the discovered genuine network asset (NA).

SUMMARY OF THE INVENTION

It may be appreciated by a person skilled in the art that currently available systems may deploy ready-made, fake NAs or traps that may correspond to the inventory list, but may not necessarily represent, or adhere to, specific details, characteristics and/or properties of actual, detected, genuine NAs.

Pertaining to the example of the printer, in a condition that the inventory list corresponding to a specific organizational network includes a printer, currently available systems may deploy, in the organizational network, a previously prepared fake NA that would represents a specific type, brand and interface of a specific printer. However, the deployed fake NA may not represent the same printer as the one discovered by the scan. In fact, in order to deploy a fake NA that may accurately represent the same genuine NA (e.g., as the discovered printer), a new fake NA may need to be prepared (e.g., manually) for each type, brand and/or configuration of each available NA (e.g., each available physical device, network resource and/or network service). It may be appreciated that such an endeavor may not be feasible in a modern, rapidly changing computing environment.

Moreover, currently available systems may not enable automated preparation of templates for fake NAs that may: (a) be based on data collected from a plurality of genuine NAs, and (b) be configurable (e.g., automatically, and/or manually) to easily (e.g., from the template and not "from scratch") prepare and deploy one or more fake NAs that accurately represent detected, genuine NAs.

The term "deploy" or "deployment" may be used herein to indicate every aspect or action that may be required to make the one or more fake NA modules operational on a protected network. For example, the term "deploy" may serve to indicate installation of a fake NA on a computing device of the protected network. Additionally, or alternatively, the term "deploy" may serve to indicate a configuration, enablement and/or execution of the fake NA on the computing device.

Embodiments of the invention may include a system and a method for automatic generation of malware detection traps. Embodiments may be configured to automatically query or interrogate one or more individual network resources or assets included in or connected to a computer network. Embodiments may obtain, by the automatic interrogation, one or more data elements pertaining to: An Operating System (OS) level fingerprint of the NA; a network-level fingerprint of the NA; a vendor associated with the NA; and/or application-level data pertaining to the NA.

As elaborated herein, embodiments of the invention may automatically produce one or more instantiations of trap modules that may imitate or emulate the one or more original NAs based on the one or more data elements of the interrogation (e.g., the OS level fingerprint, network-level fingerprint, vendor data and/or application-level data pertaining to the NA).

Additionally, or alternatively, embodiments of the invention may produce a configurable trap template module based on the one or more data elements of the interrogation. The term 'configurable' may be used in this sense to indicate an ability to receive (e.g., automatically, or via a user interface) configuration data, and create one or more instantiations of trap modules based on the template and the configuration data.

According to some embodiments, the one or more instantiations of trap modules may subsequently be deployed (e.g., within a computer network) to serve as traps or decoys for malicious software, and/or users thereof.

Embodiments of the present invention may include a method of automatic generation of malware detection traps by at least one processor. Embodiments may include, for example, performing an interrogation of at least one network asset (NA), included within a computer network; determining, based on the interrogation, one or more data elements pertaining to an OS-level fingerprint of the at least one NA; automatically generating a trap module adapted to emulate behavior of the at least one NA, based on the one or more data elements of OS-level fingerprint; and deploying, on one or more computing devices of the computer network, one or more instantiations of the trap module as decoys of the at least one NA. The one or more OS-level fingerprint data elements may include, for example, an OS type of the NA and an OS version of the NA.

Embodiments may include determining, based on the interrogation, one or more data elements pertaining to a network-level fingerprint of the NA, wherein the generated trap module may be adapted to emulate behavior of the NA, based on the one or more data elements of network-level fingerprint. The one or more network-level fingerprint data elements may include, for example, an address of the NA, an identification of one or more communication ports of the NA, status of the one or more ports, a service associated with a port of the one or more ports, and a communication protocol utilized on a port of the one or more ports.

Embodiments may include determining, based on the interrogation, one or more data elements pertaining to a vendor associated with the NA, where the generated trap module may be adapted to emulate behavior of the NA, based on the one or more vendor data elements.

Embodiments may include: selecting an open port of one or more communication ports; utilizing a communication protocol associated with the selected port to communicate with a service associated with the selected port; and obtaining one or more application-level data elements from said service, where the generated trap software module may be adapted to emulate behavior of the NA based on the determined one or more application-level data elements.

According to some embodiments, the one or more application-level data elements may include: information pertaining to a filesystem that may be comprised within the NA, information pertaining to a banner associated with the NA metadata of applications executed on the interrogated NA, and metadata of services, served by the interrogated NA.

According to some embodiments, the service associated with the selected port may be a web server, and the method may further include: communicating the web server via the computer network; and obtaining one or more application-level data elements that comprise information from a web page, served by the web server. Embodiments of the generated trap software module may be adapted to emulate application-level behavior of the NA, based on the information from the web page.

According to some embodiments, generating a trap module may include: generating, based on the interrogation, a template module; receiving, via a user interface, one or more customization data elements; and customizing the template module based on the one or more customization data elements to produce one or more instantiations of trap modules.

According to some embodiments, the one or more received customization data elements may include, for example, OS-level fingerprint data elements, network-level fingerprint data elements, vendor data elements and application-level data elements, and wherein the trap module may be adapted to emulate behavior of the NA, based on the received customization data elements.

Embodiments of the present invention may include deploying, on a computing device of the computer network, a first instantiation of a trap module and a second instantiation of a trap module, wherein the first instantiation may differ from the second instantiation by at least one of: an OS-level fingerprint data element, a network-level fingerprint data element, a vendor data element and an application-level data element.

Embodiments of the present invention may include: generating a virtual computing device on a node of the computer network; deploying, on the virtual computing device of the computer network a first instantiation of a trap module and a second instantiation of a trap module, where the first instantiation differs from the second instantiation by at least one of: an OS-level fingerprint data element, a network-level fingerprint data element, and an application-level data element.

According to some embodiments, an instantiation of at least one trap module may be adapted to: identify at least one data transaction may include access of an unauthorized computing device to the trap module; gather information pertaining to the unauthorized computing device, based on the identified at least one data transaction; and perform, based on the gathered information, at least one action of mitigation on a network component of the computer network, to evade a cyber-attack from the unauthorized computing device.

According to some embodiments, emulating behavior of the NA may include initiating one or more computer network transactions on the computer network.

Embodiments of the invention may include a system for automatic generation of malware detection traps. Embodiments of the system may include: a non-transitory memory device, wherein modules of instruction code may be stored, and at least one processor associated with the memory device, and configured to execute the modules of instruction code. Upon execution of said modules of instruction code, the at least one processor may be configured to: perform an interrogation of a NA, comprised within a computer network; determine, based on the interrogation, one or more data elements pertaining to an OS-level fingerprint of the NA; generate a trap module adapted to emulate behavior of the NA, based on the one or more data elements of OS-level fingerprint; and deploy, on one or more computing devices of the computer network, one or more instantiations of the trap module as decoys of the NA.

Embodiments of the invention may include a method of deployment of malware detection traps by at least one processor. Embodiments of the method may include: performing a first interrogation of a first NA of a specific NA family; determining, based on the interrogation, a value of one or more first NA property data elements of the first NA; obtaining one or more second NA property data elements corresponding to the specific NA family; integrating the one or more first NA property data elements and the one or more second NA property data elements to generate a template data element, corresponding to the specific NA family; producing, from the template data element, a malware detection trap module; and deploying, on one or more computing devices of a computer network, one or more instantiations of the malware detection trap module as decoys of the first NA.

Embodiments of the method may include receiving at least one configuration data element, and producing from the template data element a malware detection trap module, based on the received at least one configuration data element.

According to some embodiments, the at least one first NA property data element and the at least one second NA property data elements may include at least one of an NA type data element; an OS data element; a filesystem data element; a vendor data element; an architecture data element; a network-level fingerprint data element; and an application-level data element.

Additionally, or alternatively, obtaining one or more second NA property data elements may include performing an interrogation of a second NA; and determining the one or more second NA property data elements based on the interrogation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
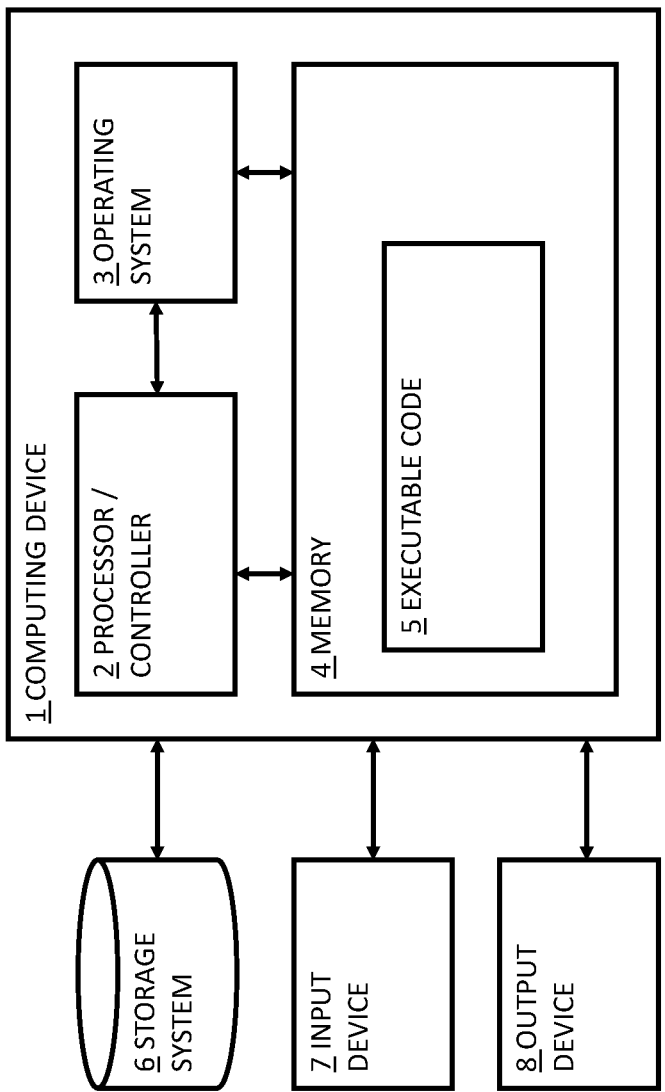
FIG. 1 is a block diagram, depicting a computing device which may be included in a system for automatic generation of malware detection traps according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for automatic generation of malware detection traps, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Controller or processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may automatically generate malware detection traps as further described herein, or may function as such a trap. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to one or more NAs may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
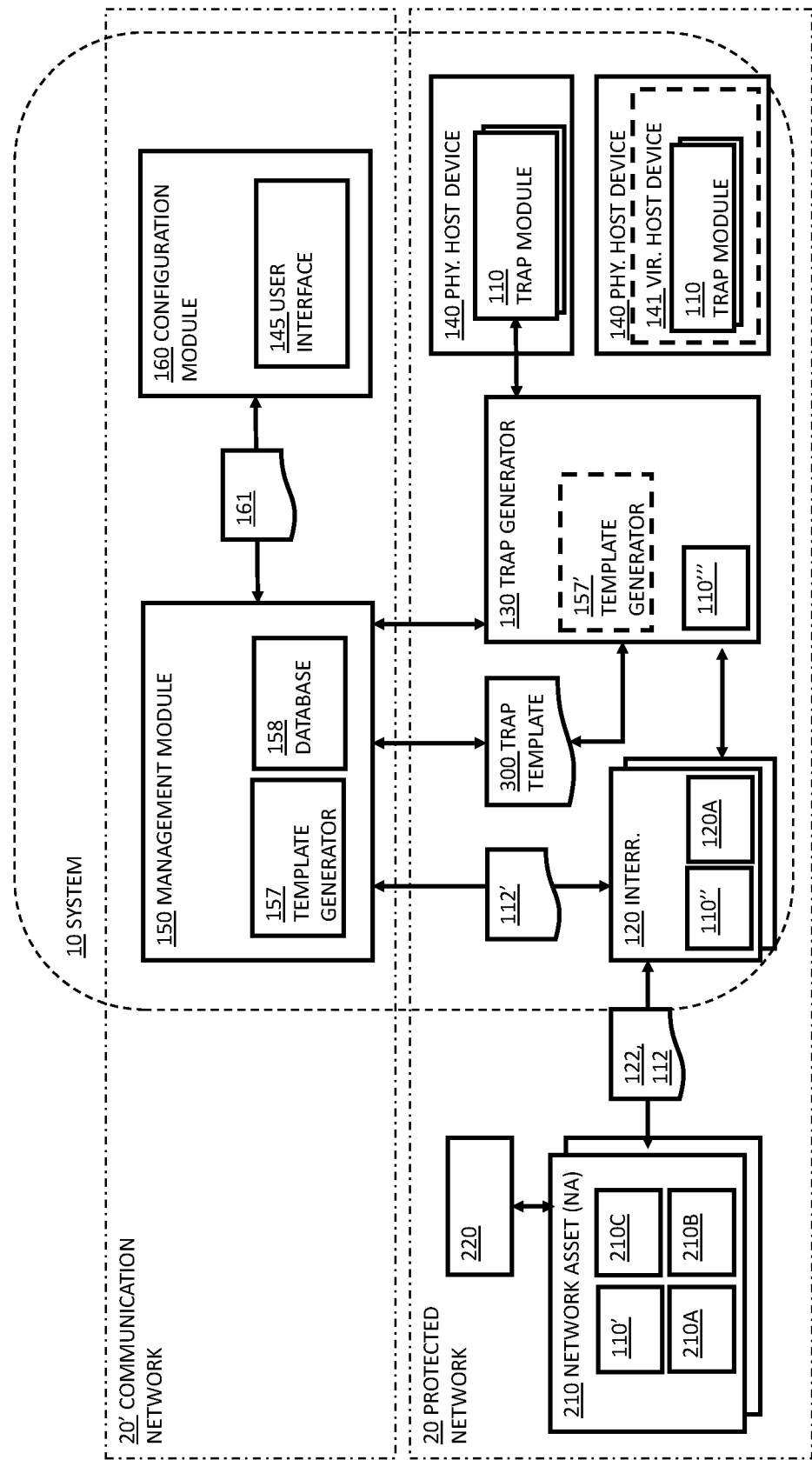
FIG. 2 is a block diagram, depicting a system for automatic generation of malware detection traps, according to some embodiments.

Reference is now made to FIG. 2 which is a block diagram, depicting a system 10 for automatic generation and/or deployment of malware detection traps in a computer network 20, according to some embodiments. System 10 may typically be deployed so as to protect one or more assets of a computer network 20 (e.g., an organizational computer network) from one or more cyber security threats. Hence, computer network 20 may be referred to herein as a "protected" computer network 20.

As shown in FIG. 2, system 10 may include one or more elements (e.g., elements 150, 160) that may reside beyond protected computer network 20, and may be communicatively connected, e.g., via a computer communication network 20' (e.g., an unprotected organizational network, the Internet, a cellular data network and the like) to one or more elements (e.g., elements 120, 130) of system 10 that may reside within protected network 20.

It may be appreciated by a person skilled in the art that protected network 20 and computer communication network 20' may include a number of sub-networks, and may employ network devices and components such as routers, switches, gateways and the like. For the sake of simplicity, such components (e.g., switches and routers) included in networks 20 and 20' have been omitted in FIG. 2.

As shown in FIG. 2, protected network 20 may include one or more NAs 210, including for example, real or genuine assets such as real services, real resources, and real devices. In this context, the term "real resource" may refer herein, for example, to data that may be stored (e.g., as part of a database) on a storage device within, or associated with protected network 20. The term "real device" may refer herein, for example, to one or more computing devices (e.g., desktop computers, laptop computers, servers, printers, Internet of Things (IOT) devices, Operational Technology (OT) devices, etc.), that may be deployed within or connected to protected network 20. The term "real service" may refer herein to a service that may be provided by a real device (e.g., a server) on protected network 20, including for example a Domain Name Service (DNS) that can translate between domain names and Internet Protocol (IP) addresses.

Figure 3:
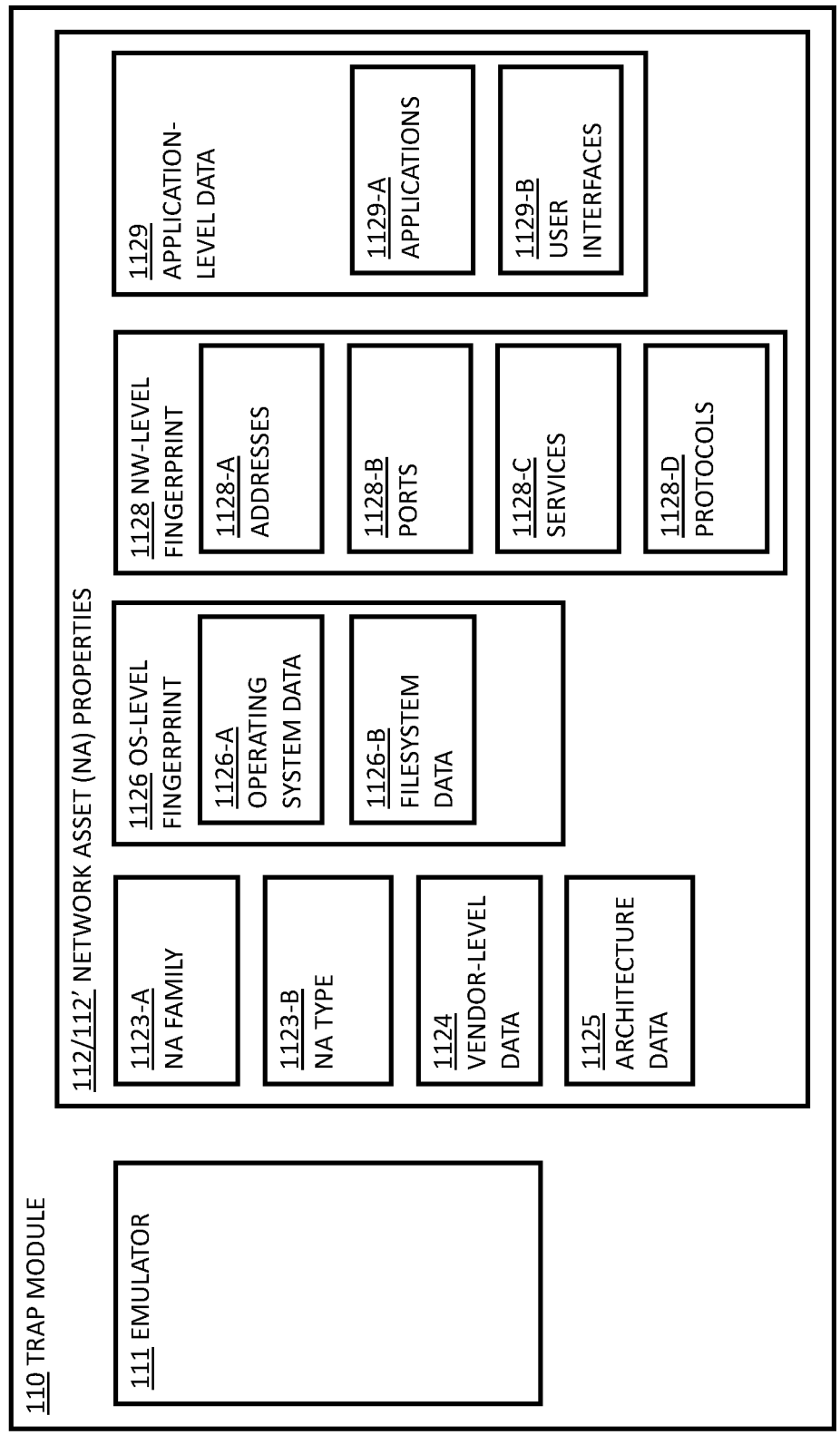
FIG. 3 is a schematic diagram, depicting content of a trap for detection of malware, according to some embodiments.

Reference is now made to FIG. 3 (in addition to FIG. 2), which is a schematic diagram, depicting an example of content of a trap module 110 for detection of malware, according to some embodiments.

According to some embodiments, system 10 may include one or more fake assets or malware detection trap modules 110. It may be appreciated that unlike real NAs 210, fake assets or trap modules trap modules 110 may not be intended to be readily used by users or applications, but rather to fake, emulate or imitate a behavior of real NAs 210. As elaborated herein, trap modules 110 may be deployed or installed within protected network 20, and may serve as a decoy to attract malicious software (and/or an attacker using such software) so as to interact with them. As further described, interaction of an attacker with one or more fake resources or trap modules 110 may enable system 10 to identify occurrence of an attack and/or determine details pertaining to the attacker, their actions, tactics, techniques, and/or procedures.

According to some embodiments, trap modules 110 may be implemented as software modules, and may be executed or implemented by one or more physical, computing devices (e.g., element 1 of FIG. 1) included in or connected to protected network 20.

Trap modules 110 may be or may include, for example, fake devices, fake resources and/or fake services that may imitate or emulate a behavior of respective real assets 210 (e.g., real devices, real resources and/or real services 210).

According to some embodiments, trap modules 110 may include or maintain (e.g., on a storage or memory device such as elements 6 and/or 4 of FIG. 1) one or more data elements 112 pertaining to NA properties. The one or more data elements 112 of NA properties may define or represent specific configurations and/or characteristics of trap module 110, as elaborated herein. Additionally, or alternatively, trap modules 110 may include an emulator module 111, adapted to emulate or imitate a behavior of a real NA 210, according to the one or more maintained NA property data elements 112, as elaborated herein.

For example, a trap module 110 that is a fake device may be a software module that may include or store properties (e.g., architecture data elements 1125) of a real NA 210 that is a real computing device. Emulator 111 of trap module 110 may thus be adapted to emulate a behavior of the real NA 210 that is a real computing device (e.g., such computing device 1 of FIG. 1), having a predefined architecture of a central processing unit (CPU) and/or a memory structure or scheme.

In another example, a trap module 110 that is a fake HTTP service may be a software module that may include or store properties (e.g., services data elements 1128-C and/or user interface data elements 1129-B) of a real NA 210 that is a real HTTP service. Emulator 111 of trap module 110 may thus be configured to emulate a behavior of the NA 210 that is a real HTTP service by, for example, communicating or sending HTTP packets (e.g., content of fake or web pages) to one or more entities (e.g., to one or more NAs 210 and/or to one or more other trap modules 110).

In yet another example, a trap module 110 that is a fake resource may be a software module that may include or store properties (e.g., services data elements 1128-C and/or protocol data elements 1128-D) of a real NA 210 that is a real resource such as a real storage device. Emulator 111 of trap module 110 may thus be adapted to emulate or imitate a behavior of a real NA 210 that is a real resource such as a real storage device within, or associated with protected network 20. Emulator 111 may thus, for example, respond to data queries (e.g., made by a perpetrator) with seemingly authentic query responses.

As known in the art, each NA 210 may include one or more characteristics or properties, pertaining to each NA type and/or instantiation. For example, the one or more characteristics or properties may include properties of an OS 210A that may be running or executing on a device NA 210. In another example, the one or more characteristics or properties may include properties of one or more services 210B (e.g., port numbers) that may be provided by a service NA 210. In yet another example, the one or more characteristics or properties may include properties of interface elements 210C (e.g., command window banners, web pages, etc.) that may be associated with a specific NA 210.

For example, a trap module 110 that is a fake device may be configured to imitate a behavior of a NA 210 having specific OS properties 210A (e.g., OS type and/or version). This may include, for example, responding to network queries (e.g., as performed by tools such as NMAP, Nessus, etc., as known in the art) with an OS-level fingerprint, as if trap module 110 was executing an OS having similar OS properties 210A.

In another example, a trap module 110 that is a fake service may be configured to imitate a behavior of a NA 210 that may execute a corresponding or similar service, having specific service properties 210B. This may include, for example, communicating over the same ports and by the same communication protocols (e.g., Hypertext Transfer Protocol (HTTP), File Transfer Protocol (FTP), Server Message Block (SMB), Telnet, etc.) as NA 210.

In yet another example, a trap module 110 that is a fake service may be configured to imitate a behavior of a genuine NA 210 that may execute a corresponding or similar service (e.g., a web service), having one or more specific interface element properties 210C (e.g., one or more web pages, one or more banners and the like). This may include, for example, responding to a query originating from a web client or web browser with a data element including content of a web page, that may be used by a genuine NA 210.

According to some embodiments of the invention, system 10 may include one or more interrogation or query modules 120, adapted to perform a query or interrogation 122 of at least one NA 210 included within or connected to protected computer network 20, as elaborated herein. The one or more interrogation modules 120 may be implemented as a software module, a hardware module or any combination thereof. For example, interrogation module 120 may be or may include or may be implemented on a computing device such as element 1 of FIG. 1, and may be adapted to execute one or more modules of executable code (e.g., element 5 of FIG. 1) to perform an interrogation 122 of at least one NA 210, as described herein.

It may be appreciated by a person skilled in the art that the interrogation 122 of the at least one NA 210 may include one of more queries (e.g. transmitted to the asset, and typically that asset alone) that may be specific to that asset. In other words, the interrogation 122 of the at least one NA 210 is typically not to be confused with a scan of protected network 20 or a subset thereof in an effort to discover or obtain an inventory of assets that are included in protected network 20.

The term "query" may be used in this context to indicate any type of a data transaction (e.g., a bidirectional data transaction) between an interrogation module 120 and a real NA 210 in an attempt to obtain one or more data elements of NA properties (e.g., elements 112, 112' of FIG. 3) as elaborated herein (e.g., in relation to FIG. 3). A query may typically include for example (a) a first data element, transferred directly or indirectly from the interrogation module 120 to the real NA 210, in an attempt to extract information therefrom; and (b) a second data element, transferred directly or indirectly from the real NA 210 to the interrogation module 120, as a response to the first data element, and typically including the sought information (e.g., the one or more data elements of NA properties 112, 112'). It may be appreciated that the type and/or content of the query may typically depend on the required information, as elaborated in examples brought herein.

For example, an interrogation 122 may be or may include a query, that may be adapted to obtain one or more data elements pertaining to an OS-level fingerprint (e.g., element 1126 of FIG. 3), such as an OS type and version of the at least one NA 210. The query may thus include a first data element, that may be or may include for example, an Internet Control Message Protocol (ICMP) message, an NMAP message and the like, adapted to obtain the required OS-level fingerprint data element (e.g., element 1126 of FIG. 3) from NA 210. NA 210 may consequently respond to the first data element (e.g., the NMAP message) with a second, response data element that may include the required OS-level fingerprint data element. Interrogation module 120 may extract the required OS-level fingerprint data from the response data element, and thus determine, based on the interrogation 122, one or more data elements pertaining to an OS level fingerprint of the at least one NA 210.

In another example, an interrogation 122 may be or may include a query, that may be adapted to obtain one or more data elements pertaining to a filesystem of NA 210 (e.g., element 1126-B of FIG. 3) as elaborated herein (e.g., in relation to FIG. 3). Interrogation 122 may include one or more queries that may be or may include messages or commands adapted to obtain the required filesystem data elements (e.g., element 1126-B of FIG. 3), as known in the art. For example, in a condition that an OS system is Unix/Linux based, a query for obtaining filesystem information may include commands such as: 'ls', 'df', 'fsck', 'lsblk', 'file', and the like. NA 210 may consequently respond to the received messages or commands of the query with a response data element that may include the required filesystem data element. Interrogation module 120 may extract the required filesystem data from the response data element, and thus determine, based on the interrogation 122, one or more data elements pertaining to a filesystem of the at least one NA 210.

In yet another example, an interrogation 122 may be or may include a query, that may be adapted to obtain one or more data elements pertaining to an application and/or an interface of NA 210 (e.g., element 1129-A, 1129-B of FIG. 3) as elaborated herein (e.g., in relation to FIG. 3). For example, in a condition that NA 210 is or includes an SQL database, the query may include one or more SQL queries adapted to obtain data pertaining to the database. Alternatively, in a condition that NA 210 is or includes a web server, the query may include one or more HTML queries adapted to obtain data pertaining to a web page that may be served by the web server. NA 210 may respond to the query by sending a response data element back to interrogation module 120. Interrogation module 120 may, in turn, extract the required application and/or an interface data (e.g., the content of the web page) from the response data element, and may thus determine, based on the interrogation 122, one or more data elements pertaining to an application and/or an interface of the at least one NA 210.

According to some embodiments, interrogation module 120 may receive (e.g., automatically, or via a user interface, as elaborated herein) a reference (e.g., a Uniform Resource Locator (URL)) or an address (e.g., a Media Access Control (MAC) address, an IP address, etc.) of a NA 210. Interrogation module 120 may perform an interrogation 122 of the NA 210 that may include at least one query for data pertaining to the NA 210. The at least one query may be adapted to obtain one or more data elements pertaining to an OS level fingerprint of the at least one NA.

For example, interrogation module 120 may receive an IP address of a NA 210 that may be or include a real computing device (such as element 1 of FIG. 1), such as a server, a desktop computer, a printer, an OT device, an IOT device and the like. Interrogation module 120 may subsequently perform an interrogation 122 that may include sending at least one message or query such as a network mapper (e.g., an NMAP query, and the like) message, addressing the IP of NA 210.

According to some embodiments, interrogation module 120 may determine, based on the interrogation 122, one or more data elements pertaining to an OS-level fingerprint of the at least one NA.

For example, as known in the art, network queries or network mappers (such as the NMAP query) may be adapted to obtain one or more data elements of OS level fingerprint, including for example, a type and/or version of an operating system (e.g., Windows, Unix, etc.); a type and/or version of an operating system kernel (e.g., Linux kernel, Unix kernel, etc.); a name and/or a version of a secure shell (e.g., SSH, OpenSSH, etc.), and the like.

According to some embodiments, system 10 may include a management module 150, adapted to manage a policy of protection for protected network 20, as elaborated herein. Management module 150 may be implemented as a software module, a hardware module or any combination thereof. For example, management module 150 may be or may include a computing device (e.g., element 1 of FIG. 1) such as a server, and may be communicatively connected to one or more interrogation modules 120, in one or more protected networks 20, e.g., via computer network 20'.

According to some embodiments, management module 150 may include a template generator module 157, adapted to receive or accumulate one or more NA properties data elements 112' pertaining to one or more networks assets 210, from one or more protected networks 20. Template generator module 157 may maintain the received or accumulated data elements 112' on a database within a storage device (e.g., such as element 6 of FIG. 1). For example, the accumulated one or more NA properties data elements 112' may be maintained as a list or table in which each entry or row may include information related to a NA 210, such as the name and type of the asset, one or more ports discovered in the interrogation 122, OS-level fingerprint data discovered in the interrogation 122, one or more services discovered in the interrogation 122, etc. According to some embodiments, template generator module 157 may utilize said NA properties accumulated data 112' to produce one or more trap templates, as elaborated herein.

According to some embodiments, system 10 may include a trap generator module 130 adapted to generate one or more trap modules 110. As elaborated herein, the one or more trap modules 110 may be adapted to emulate behavior of the at least one interrogated NA 210, based on the interrogation 122 of NA 210 (e.g., based on one or more data elements of the of OS-level fingerprint).

According to some embodiments, trap generator module 130 may be implemented as a software module, a hardware module or any combination thereof. For example, trap generator module 130 may be or may include a computing device such as element 1 of FIG. 1, and may be adapted to execute one or more modules of executable code (e.g., element 5 of FIG. 1) to perform generation of trap modules 110, as further described herein.

According to some embodiments, trap generator module 130 may be implemented on the same computing device as interrogation module 120. Additionally, or alternatively, trap generator module 130 may be implemented on the same computing device as one or more trap modules 110.

According to some embodiments, trap generator module 130 may receive (e.g., from management module 150 and/or from interrogation module 120) one or more NA properties data elements 112 pertaining to the OS-level fingerprint of an interrogated NA 210. Trap generator module 130 may subsequently automatically produce or generate a trap module 110 that may be adapted to emulate a behavior of the at least one interrogated NA 210, based on the received one or more NA properties data elements 112 (e.g., OS-level fingerprint data elements 1126).

For example, as shown in FIG. 3, trap module 110 may be a software module that may include or store one or more NA properties' data elements 112 (such as OS-level fingerprint data elements 1126), that may have been obtained from NA 210 based on an interrogation 122, as elaborated herein (e.g., in relation to interrogation module 120). Trap module 110 may further include an emulator module 111, configured to emulate a behavior of NA 210 based on the include or store one or more NA properties' data elements 112 (e.g., the OS-level fingerprint data elements 1126). For example, emulator module 111 may emulate behavior of NA 210 by responding to network messages or queries (e.g., TCP/IP messages, such as ICMP messages (e.g., 'ping'), network queries (e.g., NMAP) and the like), as if trap module 110 was a genuine or real NA 210 (e.g., the at least one interrogated NA 210). In other words, trap module 110 may include, in a response to a network message or query (e.g., initiated by an attacker), one or more data elements of the OS-level fingerprint of an interrogated NA 210, as obtained by the interrogation 122. Thus, trap module 110 may be automatically generated, based on NA properties' data elements 112 obtained through interrogation 122, and may be adapted to emulate a behavior of at least one NA 210, based on the one or more NA properties' data elements 112 (e.g., OS-level fingerprint data elements 1126), obtained through interrogation 122.

According to some embodiments, and as shown in FIG. 3, trap generator module 130 may deploy or install one or more instantiations (e.g. a specific executed instance of code, where the code may also be executing elsewhere as another instance, possibly with modifications of for example parameters or data elements defining the instantiations) of a trap module 110 on one or more computing devices (e.g., element 1 of FIG. 1) of protected computer network 20, as decoys of at least one NA 210.

For example, the one or more computing devices 1 may include one or more computing devices such as desktop computers, servers, laptop computers, virtual machines, etc., that may be NAs (e.g., element 210) of secured network 20. Trap generator module 130 may deploy or install one or more instantiations of a trap module 110 on the one or more NAs 210 (marked in FIG. 3 as 110').

According to some embodiments, trap generator module 130 may deploy one or more instantiations of a trap module 110 on one or more computing devices that may also execute an interrogation module 120 (marked in FIG. 3 as 110").

Additionally, or alternatively, trap generator module 130 may deploy one or more instantiations of a trap module 110 on one or more computing devices that may also execute a trap generator module 130 (marked in FIG. 3 as 110'").

Additionally, or alternatively, trap generator module 130 may deploy one or more instantiations of a trap module 110 on any other computing device or physical host device 140 or computer node that may be included in or associated with protected computer network 20.

Trap generator module 130 may deploy the one or more instantiations of a software trap module 110 by, for example, installing and/or executing a software trap module 110 on the one or more computing devices (e.g., 210, 120, 130, 140) of protected computer network 20, so as to execute one or more trap modules 110 as a software application, process or thread on the respective one or more computing devices.

As elaborated herein, embodiments of the invention may be configured to deploy (e.g., as software modules on nodes of protected network 20) at least one trap module 110. The at least one trap module 110 may be adapted to emulate or imitate at least one characteristic or property of a service NA 210, as elaborated herein.

According to some embodiments, interrogation module 120 may receive (e.g., from management module 150, from input device 7 of FIG. 1 and or from interrogation module 120) one or more NA properties data elements 112' pertaining to a family and/or type of one or more interrogated NAs 210. For example, in a condition that interrogated NA 210 (e.g., a network device) is a printer, a received family data element may be an identification of interrogated NA 210 as a printer. Received NA properties data element 112' may be or may include an identification of a type or specific brand (e.g., HP, Lexmark, etc.) of a printer and/or a model or version thereof. Trap generator module 130 may subsequently generate a trap module 110 that may be adapted to emulate an interrogated NA 210 (e.g., a specific type of printer) according to the received one or more NA properties data elements 112' that may include data pertaining to asset family and/or type.

Pertaining to the same example, generated trap module 110 may include a trap family data element 1123-A (e.g., defining the trap as an emulator of a printer) and/or trap type data element 1123-B (e.g., defining the trap as an emulator of a specific brand and/or model of a printer). Trap module 110 may thus respond to any received query or transmission as if it was a specific type of printer, according to the data of trap family 1123-A and/or trap type 1123-B, as elaborated herein.

As elaborated herein, interrogation module 120 may obtain one or more data elements pertaining to an OS-level fingerprint of interrogated NA 210, including for example, a type and/or version of an operating system (e.g., Windows, Unix, etc.); a type and/or version of an operating system kernel (e.g., Linux kernel, Unix kernel, etc.); a distribution of the OS (such e.g., Ubuntu, Red Hat or Debian for a Linux OS), a name and/or a version of a secure shell (e.g., SSH, OpenSSH, etc.), and the like. Trap generator module 130 may subsequently create or generate a trap module 110 that may include data relevant to the OS-level fingerprint 1126. This data (e.g., data element 1126) may include, for example, data representing a type and/or version of the OS of interrogated NA 210 (e.g., data element 1126-A) and/or data representing a filesystem (e.g., data element 1126-B) corresponding to said type and/or version of OS.

As elaborated herein, trap module 110 may be adapted to emulate interrogated NA 210 according to the OS-level fingerprint data 1126. This may include, for example, responding to network mappers or network queries (e.g., NMAP) as if trap module 110 was executing an OS having similar OS properties 210A (or presenting a similar OS-level fingerprint on network communication) as interrogated NA 210. In other words, trap module 110 may include, in a response to a received network message or query (e.g., initiated by an attacker), one or more data elements of the OS-level fingerprint of a interrogated NA 210 as obtained by the interrogation 122.

Additionally, or alternatively, trap module 110 may include, in a response to a received network message or query, one or more filesystem data elements 1126-B (e.g., directory paths) that may correspond to OS data element 1126-A.

According to some embodiments of the invention, interrogation module 120 may determine, based on the interrogation 122, one or more data elements pertaining to a network-level fingerprint 1128 (e.g., in addition to the one or more data elements of OS-level fingerprint) of NA 210.

According to some embodiments, the one or more network-level fingerprint data elements included in the network-level fingerprint 1128 may include, for example, an address 1128-A (e.g., a MAC address, a Bluetooth address, etc.) of the NA 210, an identification of one or more communication ports 1128-B of the NA 210 and/or a status (e.g., open or closed for incoming and/or outgoing data) of the one or more ports, a service 1128-C associated with a port of the one or more ports (e.g., a web service, which may commonly be associated with port 80 or port 443), and/or a communication protocol 1128-D (e.g., HTTP, or a remote access protocol such as the remote desktop protocol (RDP)) that may be utilized on a port of the one or more ports.

For example, interrogation module 120 may produce an interrogation 122 that may be, or may include a query adapted to obtain one or more network-level fingerprint data elements as elaborated above. In this condition the query may include, for example, an NMAP message or command, a 'netstat' message or command, and the like. As known in the art, the one or more NAs 210 may be configured to respond to the query (e.g., in this condition NMAP, netstat and the like) with a data element that may include the one or more network-level fingerprint data elements 1128, such as an identification of one or more ports, the ports' respective status (e.g., open/closed), the ports' respective protocols, etc. Interrogation module 120 may receive (e.g., via network 20) the response data element from NAs 210, and may extract, parse and/or obtain therefrom the one or more network-level fingerprint data elements 1128 (e.g., port numbers 1128-B, protocols 1128-D, etc.). Thus, interrogation module 120 may obtain the one or more network-level fingerprint data elements 1128 based on the interrogation 122 of the one or more NAs 210.

Trap generator module 130 may generate a trap module 110 that may include one or more data elements 1128 that are relevant to the determined network-level fingerprint information. For example, data elements 1128 may include: (a) data pertaining to one or more addresses or identifications 1128-A of interrogated NA 210; (b) data pertaining to one or more ports 1128-B of interrogated NA 210; (c) data pertaining to one or more services 1128-C that may be used on the one or more ports by interrogated NA 210; and (d) data pertaining to one or more protocols 1128-D that may be used by services of interrogated NA 210 on the one or more ports.

It may be appreciated by a person skilled in the art that one or more data elements 1128 (e.g., data elements representing addresses 1128-A of interrogated NA 210) may be modified (e.g., automatically, by trap generator module 130), to guarantee uniqueness and avoid address collisions among NAs and/or trap modules 110 (e.g., to avoid a definition of an address of a trap module that would collide with an address of interrogated NA 210).

According to some embodiments, trap module 110 may be adapted to emulate interrogated NA 210 based on the one or more data elements of network-level fingerprint (e.g., based on data elements 1128-A, 1128-B, 1128-C and/or 1128-D).

For example, in a condition in which interrogated NA 210 may be an SMB server, trap module 110 may include, one or more NA properties' data elements 112 that may be obtained as elaborated herein (e.g., in relation to interrogation module 120), based on interrogation 122. For example, the one or more NA properties' data elements 112 may pertain to dedicated communication ports (e.g., port 445, as commonly used by SMB servers), data pertaining to dedicated communication protocols (e.g., SMB and/or Transmission Control Protocol (TCP) over IP), and data pertaining to the SMB service (e.g., content of SMB messages, such as SMB request and SMB response messages).

Emulator module 111 may be adapted to emulate a behavior of NA 210, based on the one or more data elements of network-level fingerprint data elements. For example, emulator module 111 may configure trap module 110 to reply to received queries and/or messages (e.g., from an attacker) as if it was a real NA 210 such as a genuine SMB server, even though it may not actually perform the task of an SMB server (e.g., provide access to remote computing devices and/or remotely stored data elements) on protected network 20.

According to some embodiments, interrogation module 120 may determine, based on the interrogation 122, one or more data elements pertaining to a vendor that may be associated with NA 210.

For example, as known in the art, a MAC address may include an Organizational Unique Identifier (OUI) that may, as implied by the name, identify or represent a specific vendor or manufacturer. According to some embodiments, interrogation module 120 may obtain (e.g., as part of the interrogation 122, as elaborated herein) a MAC address of interrogated NA 210. Management module 150 may maintain (e.g., in a database 158) a data structure (e.g., a table, a linked list, etc.) that may associate one or more MAC addresses (and/or NA types, now saved as type data 1123-B) with respective vendors. Interrogation module 120 may thus send the obtained MAC address (and/or trap type 1123-B) to management module 150, and obtain therefrom an identification of a respective vendor.

According to some embodiments, interrogation module 120 may determine, based on the interrogation 122, one or more NA properties' data elements 112 that pertain to a processor architecture (e.g., marked architecture data elements 1125) that may be associated with or included in NA 210.

For example, as known in the art, specific OSs may be associated with specific processors upon which they may be executed. For example, AIX OSs may typically be executed on PowerPC processors, whereas Windows OSs may typically be executed on Intel or AMD processors. Management module 150 may maintain (e.g., in database 158) a data structure (e.g., a table, a linked list, etc.) that may associate one or more OS-level fingerprint data elements 1126 (e.g., OS data 1126-A) with respective processor architectures 1125 (e.g., associate Windows OSs with Intel processors as in the example above). Interrogation module 120 may thus (a) perform an interrogation 122 to obtain a data element 1126 pertaining to an OS-level fingerprint of the interrogated NA 210 (e.g., as elaborated herein in relation to interrogation module 120); (b) forward the obtained OS-level data element (e.g., as NA properties data element 112') to management module 150; and (c) receive from management module 150 a determined or suggested architecture 1125 of the interrogated NA 210, based on the data obtained through the interrogation 122.

Additionally, or alternatively, interrogation module 120 may be configured to perform further interrogation 122 of NA 210 based on the obtained OS-level fingerprint data element 1126. For example, in a condition that the determined OS-level fingerprint data element represents or describes a Unix/Linux OS, interrogation module 120 may perform a subsequent interrogation 122 that may be or may include a query (e.g., such as uname -m, as known in the art) so as to obtain one or more additional architecture data elements 1125, that may further describe or represent the processor architecture of the interrogated NA 210. Thus, interrogation module 120 may obtain data pertaining to specific processor architecture 1125 (e.g., a specific type and/or version of an Intel or ARM processor) based on the OS-level data 1126-A (e.g., a specific Windows' version).

Additionally, or alternatively, management module 150 may provide a plurality of possible or suggested processor architectures, and interrogation module 120 may receive (e.g., from configuration module 160 and/or input element 7 of FIG. 1) a selection of a specific processor architecture of the plurality of possible processor architectures.

According to some embodiments, trap generator module 130 may generate, based on the interrogation 122 a trap module 110 that may include or store one or more NA properties' data elements 112 (e.g., OS-level data 1126-A, architecture data 1125) obtained via interrogation 122. Trap module 110 may further include an emulator module 111 that may be configured (e.g., by trap generator module 130) to emulate the interrogated NA 210, according to the included or stored NA properties' data elements 112 obtained via interrogation 122.

For example, the interrogation 122 may produce network-level fingerprint data 1128 (e.g., MAC address 1128-A and subsequent one or more vendor data 1124, as elaborated above) and/or OS-level fingerprint data 1126 (e.g., operating system data 1126-A and subsequent one or more processor architecture data 1125, as elaborated above). The generated trap module 110 may include the one or more vendor-level data elements 1124 and/or the one or more data elements pertaining to architecture information 1125, and may thus be configured to emulate a behavior of the interrogated NA 210.

The emulator module 111 of generated trap module 110 may be adapted to emulate behavior of the NA 210 based on the one or more vendor data elements 1124 and/or architecture data elements 1125 in a sense that generated trap module 110 may, for example, be configured to respond to received messages and/or queries as if it was a genuine NA 210, provided by the specific vendor of vendor data 1124 (e.g., identify itself as a product of the specific vendor) and having the same architecture as that of architecture data 1125.

In another example, as known in the art, different computing devices may be configured to perform computations and/or in a manner that may characterize or correspond to their respective processor architecture. This may include, for example, a selection of an endian order (e.g., "big endian" or "little endian", as known in the art).

According to some embodiments, interrogation module 120 may obtain one or more application-level data elements from NA 210, and trap generator module 130 may generate, based on the obtained application-level data elements, a trap module 110, adapted to emulate interrogated NA 210, according to the one or more application-level data elements.

As elaborated herein, interrogation module 120 may obtain one or more data elements pertaining to network-level fingerprint of an interrogated NA 210, including for example, an identification (e.g., a number) of a communication port of interrogated NA 210, status (e.g., open/close) of the communication port, and/or a respective service that may be using that port. According to some embodiments, interrogation module 120 may select an open port of interrogated NA 210, and may utilize a communication protocol associated with or used by the selected port, to communicate with a service associated with the selected port. According to some embodiments, interrogation module 120 may then obtain one or more application-level data elements from the service.

For example, in a condition that the service is a web service, interrogation module 120 may obtain one or more data elements pertaining to network-level fingerprint of an interrogated NA 210, including for example, an identification of an open communication port of interrogated NA 210 (e.g., port 80, port 443) and a respective service (e.g., the web service) that may be using that port. Interrogation module 120 may select open port 80 or 443 (e.g., serially, among a plurality of open communication ports) of interrogated NA 210, and may utilize a communication protocol (e.g., HTTP) associated with or used by the selected port (e.g., port 80, port 443), to communicate with the web service, and obtain one or more application-level data elements (e.g., content of one or more web pages) from the service (e.g., the web service).

In another example, in a condition that the service is a data storage service, interrogation module 120 may select an open communication port (e.g., port 3389), and may utilize a remote communication protocol (such as the RDP protocol, respectively) to obtain one or more application-level data elements, including for example data and/or metadata pertaining to the data storage system and/or the relevant filesystem.

In yet another example, interrogation module 120 may obtain a name and/or a version of a command shell (e.g., Cshell, Bourne shell, etc., as known in the art) pertaining to the interrogated NA 210 and/or a user thereof.

According to some embodiments, trap generator module 130 may generate, based on the interrogation 122 (e.g., based on the retrieved one or more application-level data elements) a trap module 110. The generated trap module may include, for example, one or more application-level data elements 1129 pertaining to interrogated NA 210.

For example, application-level data elements 1129 may include data and/or metadata 1129-A of applications and/or services that may be executed on interrogated NA 210. The application-level data elements 1129 may include, for example, an identification (e.g., a name) of the applications and/or services, a location (e.g., a logical location such as a directory, a file path, a URL, and the like) in interrogated NA 210 from which the applications and/or services are executed, memory and/or CPU configuration (e.g., of a virtual computing device that may be executing the applications and/or services), etc.

In another example, application-level data elements 1129 may include information pertaining to a filesystem that is comprised within or associated with NA 210.

In another example, application-level data elements 1129 may include user interface information 1129-B, such as a data element including content of a web page, a data element including content of a banner (e.g., a command-window banner) that may be associated with the NA 210 and/or used by the applications and/or services of interrogated NA 210. For example, a service of NA 210 may be that of a web server. Interrogation module 120 may select an open communication port (e.g., port 80, port 443) associated with the web service and may communicate with the web server via protected computer network 20. Interrogation module 120 may include a web client module 120A (e.g., a web browser), adapted to obtain one or more application-level data elements that include information from a web page, served by the web server of NA 210.

The generated trap module 110 may be adapted to emulate behavior of the NA 210 based on the determined one or more application-level data elements 1129 (e.g., applications' information 1129-A and/or user interface information 1129-B) pertaining to interrogated NA 210.

Pertaining to the example of a web service, generated trap module 110 may be configured to respond to received messages and/or queries of a web client (e.g., a web browser) with content of one or more web pages that may be served by the web service of interrogated NA 210, so as to deceive the web client (or the user thereof) into believing that the generated trap module 110 is a genuine web server. Additionally, or alternatively, trap generator module 130 may receive (e.g. from input device 7 of FIG. 1, from management module 150, etc.) one or more customization data elements 161, including, for example data pertaining to content of the one or more web pages, such as textual data (e.g., in Hyper Text Markup Language (HTML) format), styling data (e.g., in Cascading Style Sheet (CSS) format) and the like. Trap generator module 130 may modify the web service of interrogated NA 210 according to the received one or more customization data elements 161, so as to respond to received messages and/or queries of a web client (e.g., a web browser) with the respective modified content.

As elaborated herein, trap generator module 130 may deploy the one or more instantiations of a software trap module 110 by, for example, installing and/or executing a software trap module 110 on the one or more computing devices (e.g., 210, 120, 130, 140) of protected computer network 20, so as to execute trap module 110 as a software application, thread or process on the respective one or more computing devices.

According to some embodiments, trap generator module 130 may install or deploy a plurality of trap modules 110 on a computing device of the computer network. For example, trap generator module 130 may deploy a first instantiation of a trap module and a second instantiation of a trap module on the same computing device (e.g., 210, 120, 130, 140), where the first instantiation may differ from the second instantiation by NA property data element.

For example, the first instantiation may differ from the second instantiation by at least one OS-level fingerprint data element 1126 such as an OS type of the NA and an OS version of the NA.

Additionally, or alternatively, the first instantiation may differ from the second instantiation by at least one of: a network-level fingerprint data element 1128 as elaborated herein, a vendor data element 1124 as elaborated herein and an application-level data element 1129 as elaborated herein. For example, the first instantiation of trap module 110 may be adapted to emulate a behavior of a first interrogated NA 210, and the second instantiation of trap module 110 may be adapted to emulate a behavior of a second, different interrogated NA 210.

According to some embodiments, the deployed trap modules 110 may be configured to emulate behavior of one or more respective NAs 210 by initiating one or more computer network transactions on protected computer network 20 and/or to computing devices of communication network 20'. It may be appreciated by a person skilled in the art that a perpetrator who may tap into protected network 20 (e.g., a human user and/or malware code adapted to identify and exploit a vulnerability of protected network 20) may be confused by these transactions into believing that a trap modules 110 is, in fact a genuine NA.

For example, trap module 110 may emulate a client module (e.g., a web client module), adapted to communicate with a genuine NA 210 such as a server module (e.g., a genuine web server). Trap module 110 may initiate communication with NA 210, to deceive a perpetrator into thinking that it is a genuine client module.

In another example, a first trap module 110 may be adapted to emulate a behavior of a genuine client module (e.g., a web client module) and a second trap module 110 may be adapted to emulate a behavior of a genuine server module (e.g., a web server module). The first trap module 110 may initiate a communication with the second trap module 110, to obfuscate a perpetrator into thinking that both trap modules 110 are in fact genuine NAs 210.

As known in the art, a virtual computing device, virtual host or virtual machine 141 may be software module, configured to operate or be executed on a physical, host computing device 140 (e.g., element 1 of FIG. 1). The virtual computing device or host 141 may utilize computing assets of the physical host computing device 140, according to user configurations. For example, a user may dictate or configure that a host device having a first number of CPU cores, a first memory configuration of memory resources and running a first OS (e.g., Windows) may run a virtual machine that will exhibit a second number of CPU cores, a second configuration of memory resources and a second OS (e.g., Linux).

According to some embodiments of the invention, trap generator module 130 may generate or install a virtual computing device 141 on a physical host computing device 140 (e.g., element 1 of FIG. 1) of computer network 20. Additionally, trap generator module 130 may deploy one or more trap modules 110 on the installed virtual computing device.

In other words, trap generator module 130 may deploy one or more trap modules 110 on a virtual host device 141 that may be installed on a physical node or physical computing device 140 of protected computer network 20 (e.g., host device 140) based on the one or more vendor-level data elements 1124.

According to some embodiments, (e.g., a trap module emulating a printer device) trap generator module 130 may deploy one or more trap modules 110 based on one or more vendor-level data elements 1124.

For example, trap generator may receive one or more vendor 1124 data elements (e.g., an identification of a vendor of a NA such as Samsung, HP, etc.) pertaining to a NA (e.g., a printer) of a specific NA family (e.g., printers) from interrogation module 120. Trap generator module 130 may generate, install or configure on virtual machine 141 (that may be hosted on a host device 140) at least one trap module 110, based on the received vendor-level data elements 1124 (e.g., so as to emulate a behavior of a NA of a specific NA family (e.g., printer) that may correspond to that of an interrogated NA 210 (e.g., an HP printer)).

Additionally, or alternatively, trap generator module 130 may receive from interrogation unit 120 one or more architecture-level data elements 1125 pertaining to an interrogated NA 210. The one or more architecture-level data elements 1125 may include, for example, information pertaining to or representing a specific processing unit (e.g., a CPU) core architecture (e.g., an Intel architecture, an AMD architecture, a PowerPC architecture and the like) and/or information pertaining to a memory structure that may be employed by said. Trap generator module 130 may generate, install or configure on virtual machine 141 at least one trap module 110, based on the received architecture-level data elements 1125. For example, the at least one trap module 110 may be configured to emulate a behavior of a NA that may employ a processing unit core architecture that may be similar or identical to that of the interrogated NA 210.

Additionally, or alternatively, trap generator module 130 may deploy, on the virtual computing device 141 one or more instantiations of trap modules 110. The one or more instantiations of trap modules 110 may correspond to properties or NA property data elements of interrogated NAs, as provided by interrogation module 120. For example, trap generator module 130 may deploy, on the virtual computing device 141 a first instantiation of a trap module 110 and a second instantiation of a trap module 110. The first instantiation 110 may differ from the second instantiation 110 by, for example, at least one OS-level fingerprint data element 1126 (e.g., an OS type and/or version, as elaborated herein. Additionally, or alternatively, the first instantiation 110 may differ from the second instantiation by at least one of: a network-level fingerprint data element 1128 such as a MAC address, an identification a communication port, status of the port, a service associated with the port a communication protocol associated with the port, etc. as elaborated herein (e.g., in relation to FIG. 3), and an application-level data element 1129 such as a data element including content of a web page, as elaborated herein (e.g., in relation to FIG. 3).

According to some embodiments, interrogation module 120 may perform an interrogation 122 (that may include one or more queries) of a NA 210 and receive from NA 210 (e.g., via network 20) a response to the interrogation 122, including one or more NA properties data elements 112. Interrogation module 120 may send one or more NA properties data elements (marked in FIG. 3 as 112') that are outcomes of interrogation 122 (e.g., OS-level fingerprint data elements 1126, network-level fingerprint data element 1128, vendor-level data elements and/or application-level data element 1129) to management module 150. Management module 150 may analyze the interrogation outcome (e.g., NA properties data elements 112') and may generate, based on interrogation 122, a trap template 300. Trap template 300 may then be customized to produce various instantiations of trap modules 110.

For example, interrogation module 120 may perform an interrogation 122 of an NA 210 of a specific NA family (e.g., a Windows server), and may determine, based on the interrogation (e.g., as elaborated above), a value of one or more first NA property data elements 112' of the first NA 210 (e.g., a first protocol type 1128-D such as a Microsoft SQL Server Protocol (MSSQL)). Interrogation module 120 may propagate the one or more first NA property data elements 112' to management module 150 as elaborated herein. Management module 150 may then obtain one or more second NA property data elements 112' corresponding to the specific NA family (e.g., a second protocol type 1128-D such as an Exchange server protocol). The one or more second NA property data elements 112' may, for example, be obtained via interrogation module 120, by interrogating 122 the first NA 210 (e.g., on a second interrogation 122 of the first NA 210), by interrogating 122 a second NA 210 and obtaining the one or more second NA properties based on the interrogation of the second NA 210, and/or via an input device (e.g., user interface 145 and/or element 7 of FIG. 1). Management module 150 may include a template generator module 157 that may be adapted to integrate the one or more first NA property data elements and the one or more second NA property data elements to generate a template data element 300, corresponding to the specific NA family. Pertaining to the example of the Windows Server, the integrated template data element 300 may include the one or more first NA property data elements 112' (e.g., the first protocol) and the one or more second NA property data elements 112' (e.g., the second protocol).

According to some embodiments management module 150 may propagate the template data element 300 to trap generator module 130, which may, in turn produce from the template data element 300 a malware detection trap module 100. For example, trap generator module 130 may receive (e.g., from configuration module 160, via management module 150) at least one configuration data element 161 (e.g., a selection of a specific Windows server protocol to emulate, MSSQL and/or Exchange). Trap generator module 130 may subsequently produce from the template data element a malware detection trap module based on the received at least one configuration data element (e.g., emulating the selected protocols). Additionally, or alternatively trap generator module 130 may deploy, on one or more computing devices of a computer network, one or more instantiations of the malware detection trap module 110 as decoys of at least one real NAs 210. Pertaining to the same example, trap generator module 130 may deploy, on one or more computing devices of protected computer network 20 a malware detection trap module 110 that may be adapted to emulate Microsoft Windows server a behavior, at least in an aspect of a usage of a predetermined protocol.

It may be appreciated that the usage of trap templates as elaborated herein, and integration of NA properties pertaining to specific families of NAs may provide an improvement over currently available technology for malware detection, as they may for example automatically aggregate information regarding real NAs 210 (e.g., devices, services and/or resources), and may emulate aspects of behavior of real NAs 210 that may be unknown or non-existent in the context of the protected network 20. In other words, embodiments of the invention may not need to discover specific network assets and may not need to interrogate every aspect of such discovered NAs in order to emulate behavior of an ever-expanding variety of NAs that may be available in computing networks around the world.

Additionally, or alternatively, interrogation module 120 may perform an interrogation 122 of a NA 210, and may obtain, as elaborated herein, one or more NA properties' data elements 112 of NA 210. Interrogation module 120 may transfer the one or more NA properties' data elements 112 of NA 210 to trap generator module 130. According to some embodiments, trap generator module 130 may include a template generator module 157 (marked as 157' in FIG. 2) that may be adapted to generate, based on the interrogation 122, a trap template 300 as elaborated above. According to some embodiments, trap generator module 130 may propagate or transfer the generated trap template 300 to management module 150, and management module 150 may store (e.g., on database 158) the generated trap template 300, for future use, as elaborated herein.

For example, a interrogated NA 210 may be a printer of a specific first model, produced by a first manufacturer (e.g., HP). Interrogation module 120 may obtain properties or characteristics of the interrogated NA 210 (e.g., the printer), such as OS-level fingerprint data elements 1126, network-level fingerprint data element 1128, vendor-level data elements and/or application-level data element 1129, as depicted in FIG. 3.

Management module 150 may generate a trap template 300 that may include a subset of the characteristics or properties depicted in FIG. 3, so as to produce a generalization of the interrogated NA or device 210 (e.g., the printer). For example, management module 150 may configure trap template 300 as a template for the first model of printers, that may be produced by the first manufacturer (e.g., HP). In this example, the trap family 1123-A data element may include information that may describe or represent a relevant family of NAs (e.g., printers or IoT devices) and the trap type 1123-B data element may include information that may describe or represent a type of the relevant NA (e.g., in this case, a description of a specific model of a printer pertaining to the specific vendor HP).

It may be appreciated by a person skilled in the art that management module 150 may produce or generate trap template 300 based on data that may be accumulated or received from one or more NAs 210 that reside or execute beyond protected network 20. For example, a first interrogation module 120 may perform an interrogation 122 on a first network asset, resident within a first organizational network. First interrogation module 120 may transfer one or more NA properties data elements 112' to management module 150. Management module 150 may produce trap template 300 based on interrogation results 112', and transfer trap template 300 to a trap generator at a second organizational network which may be a protected network 20.

According to some embodiments, trap template 300 may include one or more configurable fields, parameters or data elements. Pertaining to the same example, application-level data 1129 may include, for example, configurable user interface information 1129-B, such as a data element including content of a web page, one or more configurable data elements or parameters such as a list of roles and permissions for specific users, and the like. The term "configurable" may refer herein to a condition in which one or more of the configurable elements may be changed (e.g., manually, by a human user via input device 7 of FIG. 1 and/or automatically by trap generator module 130), so as to produce a trap module 110 as elaborated herein.

According to some embodiments, system 10 may include a configuration module 160. Configuration module 160 may be implemented in software, hardware or any combination thereof. For example, configuration module 160 may be implemented as a software module, and may be implemented or executed by a computing device (e.g., element 1 of FIG. 1). Configuration module 160 may be or may include a user interface 145, adapted to receive (e.g., via an input device such as element 7 of FIG. 1 or from another computing device) one or more customization data elements 161. Management module 150 may communicate with configuration module 160 so as to receive (e.g., via a user interface 145) the one or more customization data elements 161.

For example, the one or more received customization data elements 161 may be selected from a list consisting of: OS-level fingerprint data elements, network-level fingerprint data elements, vendor data elements and application-level data elements. Pertaining to the printer example, customization data elements 161 may include specific management web pages, that may be pertain to a second NA, such as a second instantiation of an HP printer.

According to some embodiments, management module 150 may communicate the trap template 300 and/or the customization data elements 161 to trap generator module 130. Trap generator module 130 may then customize the template 300 based on the one or more customization data elements 161 to produce one or more instantiations of trap modules 110. As elaborated herein, the produced one or more trap module 110 may then emulate behavior of a NA, based on the received customization data elements 161.

Additionally, or alternatively, management module 150 may communicate with interrogation module 120 so as to receive one or more NA properties data elements 112', (e.g., OS-level fingerprint data elements 1126, network-level fingerprint data element 1128, vendor-level data elements and/or application-level data element 1129) that are outcomes of an interrogation 122 of a second NA 210 (e.g., a printer of a second model). Management module 150 may communicate the trap template 300 and/or one or more NA properties data elements 112' (e.g., of the second printer model) to trap generator module 130. Trap generator module 130 may then customize the template 300 based on the one or more NA properties data elements 112' to produce one or more instantiations of trap modules 110. As elaborated herein, the produced one or more trap modules 110 may then emulate behavior of a NA, based on the received one or more NA properties data elements 112' of the second NA 210.

It may be appreciated by a person skilled in the art, that embodiments of the invention may thus enable: (a) automatic interrogation 122 of a first NA (e.g., a printer) and creation of a trap template 300 for a relevant family (e.g., printers) or type (e.g., printers of a specific vendor) of corresponding NAs; (b) based on additional information that may be introduces manually (e.g., via configuration module 160) or automatically, by interrogating a second NA (e.g., a different printer), configuring the trap template 300, to produce and/or deploy one or more instantiations of a trap module 110; and (c) emulating behavior of a genuine NA based on the introduced data 161 and/or NA properties data element 112'.

According to some embodiments of the invention, at least one instantiation of a trap module 110 may be adapted to perform an action of mitigation or preemption, so as to prevent an attacker from further performing illicit actions on protected network 20.

For example, as explained herein, legitimate users of protected network 20 may be oblivious to the installation of trap module 110 and may thus normally not communicate with it. Trap module 110 may identify reception of at least one data transaction (e.g., application data and/or network communication packets) as an attempt to access trap module 110 by an unauthorized computing device (e.g., a device pertaining to an attacker).

Trap module 110 may thus gather information pertaining to the unauthorized computing device (e.g., an identification and/or an address thereof), based on the identified at least one data transaction. Trap module 110 may subsequently perform, based on the gathered information (e.g., the identification) at least one action of mitigation or preemption on a network component of the computer network, to mitigate, evade or respond to a cyber-attack from the unauthorized computing device. For example, trap module 110 may configure at least one network component (e.g., a network gateway or router) or emit a notification thereto, so as to avoid communication between the identified unauthorized computing device and other real or genuine assets in the network. In another example, embodiments of the invention may produce or display (e.g., via a display screen associated with user interface 145) one or more messages or notifications, so as to warn against, or identify an action of the unauthorized computer device or attacker.

Figure 4:
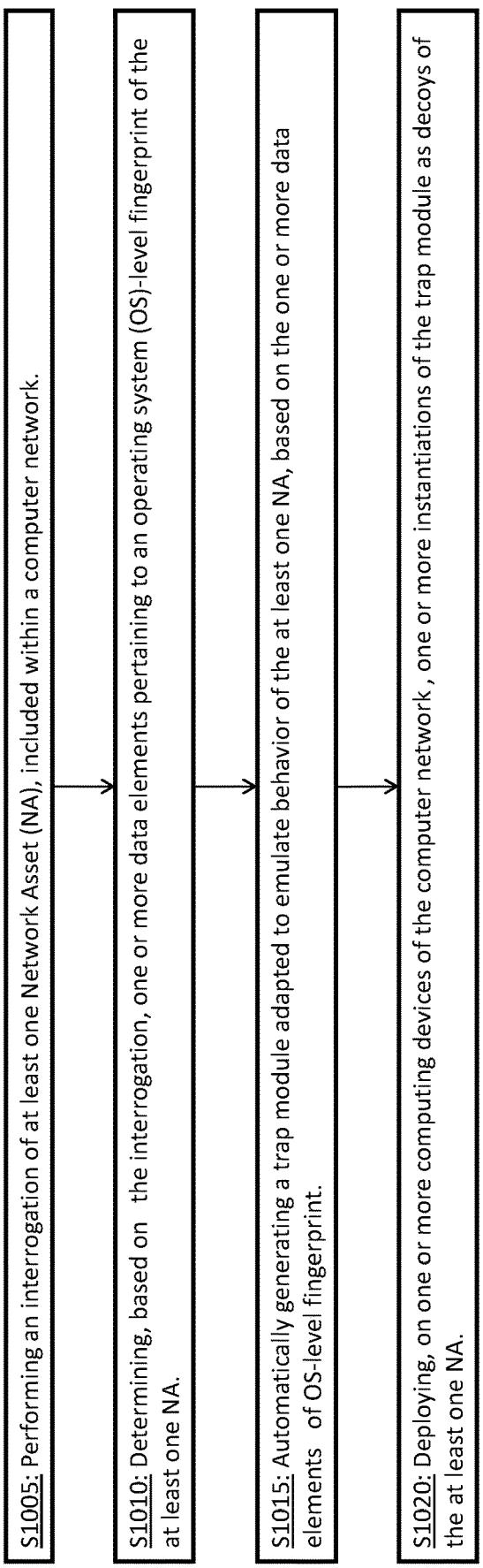
FIG. 4 is a flow diagram, depicting a method of automatic generation of malware detection traps, according to some embodiments.

FIG. 4 is a flow diagram, depicting a method of automatic generation of malware detection traps by at least one processor (e.g., element 2 of FIG. 1) according to some embodiments.

As shown in step S1005, the at least one processor 2 may perform (e.g., by interrogation module 120 of FIG. 2) an interrogation (e.g., element 122 of FIG. 2) of at least one NA (e.g., element 210 of FIG. 2) that may be included within a computer network (e.g., protected network 20 of FIG. 2). The interrogation 122 may include one or more queries, messages and/or commands, adapted to obtain from NA 210 one or more NA properties data elements 112, as elaborated herein (e.g., in relation to FIG. 2 and/or FIG. 3).

As shown in step S1010, the at least one interrogated NA 210 may respond (e.g., via network 20) to the interrogation (e.g., to one or more queries included therein) with at least one response data elements that may include the one or more NA properties data elements 112. The at least one processor 2 may determine, based on the interrogation (e.g., from the at least one response data element), one or more NA properties data elements 112, including for example at least one data elements pertaining to an OS-level fingerprint (e.g., element 1126 of FIG. 3) of the at least one NA 210;

As shown in step S1015, the at least one processor 2 may automatically generate (e.g., via trap generator element 130 of FIG. 3) a trap module (e.g., element 110 of FIG. 3). As elaborated herein, trap module 110 may be adapted to emulate behavior of the at least one NA, based on the one or more obtained NA properties' data elements 112.

For example, as elaborated herein (e.g., in relation to FIG. 3), trap module 110 may include or store one or more data elements 112 of NA properties obtained via interrogation 122, including for example at least one OS-level fingerprint data element 1126 (e.g., OS type and/or version). Trap module 110 may further include an emulator module 111, configured (e.g., by trap generator 130) to emulate behavior of interrogated NA 210 based on the stored or included one or more data elements 112 of NA properties, obtained via interrogation 122. For example, emulator 111 may be configured to produce at least one data transmission (e.g., in response to a received query, for example from an attacker's computing device, or independent of such received query), as if the trap module 110 was a genuine NA 210 having one or more NA properties as interrogated NA 210.

As shown in step S1020, and in FIG. 2, the at least one processor 2 may automatically deploy (e.g., by trap generator 130), on one or more computing devices (e.g., on one or more physical host device 140 and/or on one or more computing devices executing modules 120, 130) of the computer network, one or more instantiations of the trap module 110 as decoys of the at least one interrogated NA 210.

Figure 5:
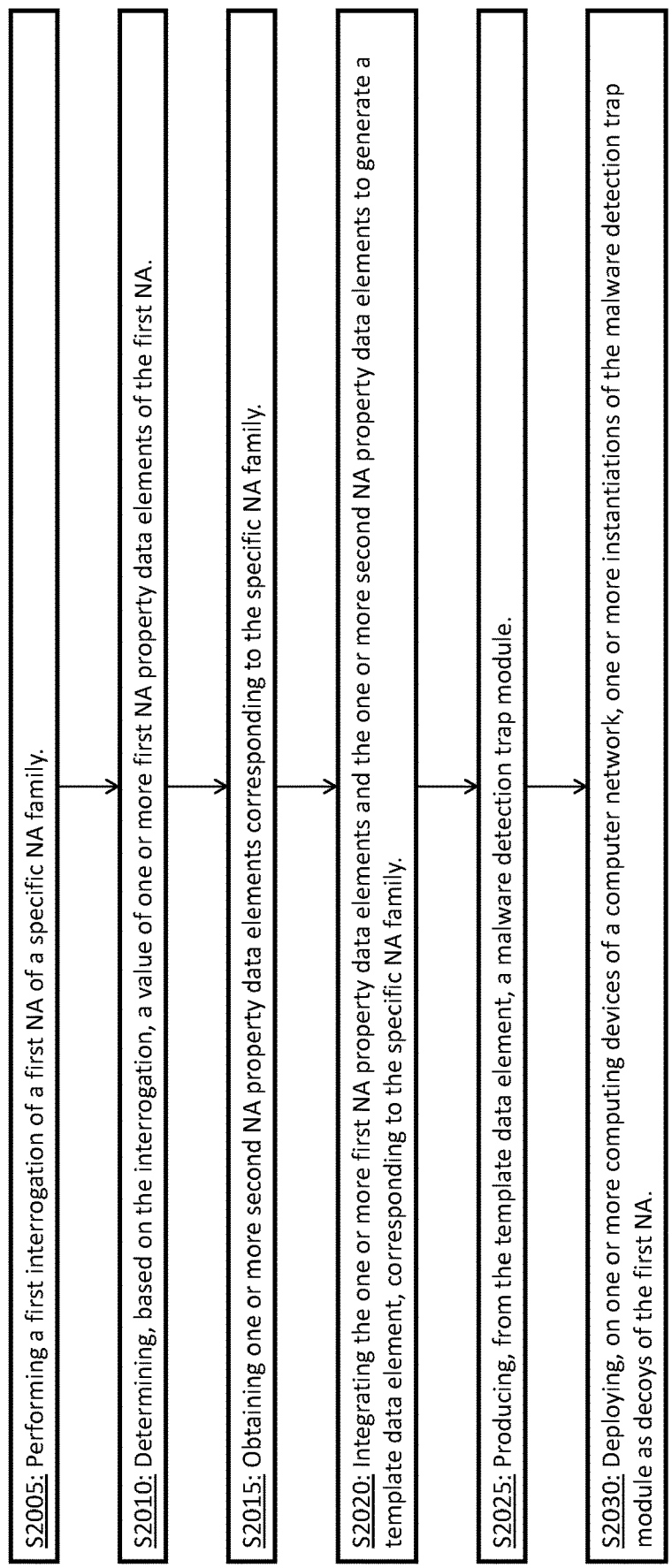
FIG. 5 is a flow diagram, depicting a method of deployment of malware detection traps, according to some embodiments.

FIG. 5 is a flow diagram, depicting a method of deployment, by at least one processor (e.g., element 2 of FIG. 1), of malware detection traps, according to some embodiments.

As shown in step S2005, the at least one processor 2 may perform a first interrogation 122 (e.g., via interrogation module 120) of a first NA 210 of a specific NA family 1123-A. For example, the NA family 1123-A may pertain to, or may represent NAs that are included in a specific group of devices such as printers. Interrogation module 120 may interrogate an NA 210 that may be a printer of a specific first type, produced by a first specific vendor (e.g., Epson).

As shown in step S2010, the at least one processor 2 may determine (e.g., via interrogation module 120), based on the interrogation 122, a value of one or more first NA property data elements of the first NA. For example, interrogation module 120 may perform an HTTP query (e.g., as part of interrogation 122) of the specific first NA (e.g., the printer), and may obtain a value of a first NA property data element 112 that may pertain to a user interface of the printer, such as a content of a web page that may be used to interface the printer on network 20.

As shown in step S2015, at least one processor 2 may obtain one or more second NA property data elements 112 corresponding to the specific NA family 1123-A. For example, a management module 150 computing device may be configured to receive content of a web page pertaining to a second type of printer (e.g., a second model of an Epson printer, a printer of a second vendor (e.g., HP), and the like). It may be appreciated that the one or more second NA property data elements 112 may be obtained through an input device (e.g., via a configuration module 160, through an input device 7 of FIG. 1, etc.). Additionally, or alternatively, the one or more second NA property data elements 112 may be obtained by interrogation module 120 through interrogation 122 of one or more second NA 210 (e.g., a second printer) on network 20. Additionally, or alternatively, the one or more second NA property data elements 112 may be obtained by an interrogation module 120 through interrogation 122 of one or more second NA 210 (e.g., a second printer) on a different network (e.g., another protected network 20 and/or a communication network 20' beyond protected network 20).

As shown in step S2020, at least one processor 2 (e.g., a processor 2 of management module 150) may integrate the one or more first NA property data elements 112 and the one or more second NA property data elements 112 to generate a template data element 300, corresponding to the specific NA family. Pertaining to the example of NA 210 that belong to the family 1123-A of printer devices, template 300 may include data pertaining to a first web page 1129-B of the first printer, and data 1129-B pertaining to a second web page of the second printer.

As shown in step S2025, at least one processor 2 (e.g., a processor of trap generator module 130) may produce, from the template data element 300, a malware detection trap module 110. Pertaining to the example of printer web pages, trap generator module 130 may receive (e.g., via user interface 145) a configuration data element (e.g., a selection of a specific type or content of a field in a web page), and may produce a trap module 110 that may be adapted to emulate a behavior of an NA 210 such as a printer (e.g., present a web page of the NA 210, as a response to a network query), according to the at least one NA property data elements 112 (e.g., at least one of the first web-page content data element 1129-B and second web-page content data element 1129-B).

As shown in step S2030, at least one processor 2 (e.g., a processor of trap generator module 130) may deploy, as elaborated herein, on one or more computing devices of a computer network (e.g., on a physical host device 140, and the like), one or more instantiations of the malware detection trap module 110 as decoys of at least one of the first NA 210 and second NA 210.

It may be appreciated by a person skilled in the art that any order of interrogation 122 of the one or more NAs 210, and obtaining NA properties data 112' (e.g., OS-level fingerprint data elements 1126, network-level fingerprint data element 1128, vendor-level data elements and/or application-level data element 1129) therefrom (e.g., obtaining OS-level fingerprint data 1126 before vendor-level data 1124) as may be elaborated herein, may serve as a non-limiting example. Embodiments of the invention may employ any additional order of interrogating the one or more NAs 210, and obtaining NA properties data 112' therefrom.

It may be appreciated by a person skilled in the art that embodiments of the invention may enable manual or automatic creation and/or deployment of a trap module 110 based on a configurable trap template 300 and on additional configuration data 161 and/or additional NA properties data 112' as elaborated herein (e.g., in relation to FIG. 2 and/or FIG. 3).

Additionally, trap generator module 130 may deploy the one or more instantiations of a software trap module 110 in a manner that is scalable. For example, trap generator module 130 may deploy a plurality of instantiations of a software trap module 110, e.g., in relation to a respective plurality of subnets or other divisions of protected network 20.

Additionally, trap generator module 130 may deploy the one or more instantiations of a software trap module 110 in a manner that is configurable. According to some embodiments, trap generator module 130 may apply one or more modifications to the one or more instantiations of a trap module 110, as part of the deployment. For example, trap generator module 130 may modify or set a value of one or more parameters of the OS-level fingerprint (e.g., a communication port, etc.), to match one or more properties of the corresponding computing device (e.g., 210, 120, 130, 140).

It may be appreciated by a person skilled in the art that trap generator module 130 may deploy the one or more instantiations of a software trap module 110 in a manner that may not intervene in an operational data path of protected network 20. For example, a genuine or legitimate user of a computer node 220 (e.g., a computing device 1 such as a desktop computer) included within protected network 20 may communicate with one or more legitimate or genuine assets 210 of protected network 20 (e.g., a printer) via protected network 20, without sending to, or receiving any message from a deployed software trap module 110.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A system comprising:
   one or more non-transitory, computer-readable media having computer-executable instructions stored thereon; and
   one or more hardware processors that, having executed the computer-executable instructions, configure the system to:
   detect, by a first instantiation of a trap module, an attempt to access the first instantiation of the trap module,
   wherein the first instantiation of the trap module executes as a software application on a first computing device operating in a computer network, and
   wherein the attempt is initiated by a source that is not authorized to operate in the computer network;
   gather, by the first instantiation of the trap module, information about the source;
   responsive to the attempt, emulate, by the first instantiation of the trap module, one or more behaviors of a network asset operating in the computer network,
   wherein the network asset is distinct from the first computing device;
   wherein prior to the attempt the system was further configured to:
   perform an interrogation of an application that executes on the network asset to determine one or more behaviors of the network asset in response to the interrogation,
   generate and configure the trap module to emulate at least some of the one or more behaviors of the network asset that were determined in the interrogation, and
   deploy the first instantiation of the trap module on the first computing device.

2. The system of claim 1, wherein the first instantiation of the trap module is configured to emulate at least one of the one or more behaviors of the network asset to respond to the source.

3. The system of claim 1, wherein the interrogation of the application determined one or more application-level data elements that are based on the one or more behaviors of the network asset, and
   wherein the trap module is configured to use the one or more application-level data elements to emulate at least one of the one or more behaviors of the network asset.

4. The system of claim 3, wherein the first instantiation of the trap module is configured to emulate at least one of the one or more behaviors of the network asset to respond to the source by using at least one of the one or more application-level data elements.

5. The system of claim 3, wherein the one or more application-level data elements comprise one or more of: data about a data storage system, and metadata about the data storage system.

6. The system of claim 3, wherein the one or more application-level data elements comprise one or more of: an identification of the application, and a location in the network asset from which the application executes on the network asset.

7. The system of claim 3, wherein the one or more application-level data elements comprise one or more of: a directory from which the application executes on the network asset, a file path to the application at the network asset, a universal resource locator (URL) to the application at the network asset.

8. The system of claim 3, wherein the one or more application-level data elements comprise configuration information about one or more of: a computer memory and a central processing unit (CPU) of the network asset.

9. The system of claim 3, wherein the one or more application-level data elements comprise one or more of: at least some user interface information, at least some contents of a web page, and at least some contents of a banner associated with the application.

10. The system of claim 3, wherein the one or more application-level data elements comprise one or more of: information about a filesystem of the network asset, information about a banner associated with the application, and metadata of the application.

11. The system of claim 3, wherein the system is further configured to:
  select an open port of one or more communication ports at the network asset;
  utilize a communication protocol associated with the open port to communicate with a service associated with the open port; and
  wherein the one or more application-level data elements are based at least in part on communicating with the service associated with the open port.

12. The system of claim 11, wherein the service associated with the open port is a web server, and wherein the one or more application-level data elements comprise one or more of: information from a web page that is served by the web server; and
  wherein the trap module is configured to emulate at least some behavior of the network asset based on the information from the web page.

13. The system of claim 1, wherein to generate the trap module the system is further configured to:
  generate a template module based on the interrogation;
  receive, via a user interface, one or more customization data elements; and
  customize the template module based on the one or more customization data elements to produce one or more instantiations of the trap module;
  wherein the one or more customization data elements comprise one or more of: operating system (OS)-level fingerprint data elements, network-level fingerprint data elements, vendor data elements, and one or more application-level data elements, and wherein the trap module is configured to emulate at least some behavior of the network asset, based on the one or more customization data elements.

14. A computer-implemented method performed by at least one hardware processor, the method comprising:
  detecting, by a first instantiation of a trap module, an attempt to access the first instantiation of the trap module,
  wherein the first instantiation of the trap module executes as a software application on a first computing device operating in a computer network, and
  wherein the attempt was initiated by a source that is not authorized to operate in the computer network;
  gathering, by the first instantiation of the trap module, information about the source;
  responsive to the attempt, emulating, by the first instantiation of the trap module, one or more behaviors of a network asset operating in the computer network,
  wherein the network asset is distinct from the first computing device;
  and wherein prior to the attempt:
  performing an interrogation of an application that executes on the network asset to determine one or more behaviors of the network asset in response to the interrogation,
  generating and configuring the trap module to emulate at least some of the one or more behaviors of the network asset that were determined in the interrogation, and
  deploying the first instantiation of the trap module on the first computing device.

15. The computer-implemented method of claim 14, wherein emulating the one or more behaviors of the network asset comprises initiating one or more computer network transactions on the computer network.

16. The computer-implemented method of claim 14, further comprising: determining, based on the interrogation, one or more network-level data elements about a network-level fingerprint of the network asset, wherein the trap module is further configured to use the one or more network-level data elements to emulate the one or more behaviors of the network asset, wherein the one or more network-level data elements comprise one or more of: an address of the network asset, an identification of one or more communication ports of the network asset, status of the one or more communication ports, a service associated with a communication port of the one or more communication ports, and a communication protocol utilized on a communication port of the one or more communication ports.

17. The computer-implemented method of claim 14, further comprising: determining, based on the interrogation, one or more vendor data elements about a vendor associated with one or more of: the application, and the network asset, wherein the trap module is further configured to use the one or more vendor data elements to emulate the one or more behaviors of the network asset.

18. The computer-implemented method of claim 14 further comprising: determining, based on the interrogation, one or more operating system (OS) data elements about an OS-level fingerprint of an OS of the network asset, wherein the trap module is further configured to use the one or more OS data elements to emulate the one or more behaviors of the network asset.

19. The computer-implemented method of claim 14, further comprising: deploying, on the first computing device, a second instantiation of the trap module, wherein the second instantiation differs from the first instantiation by one or more of: an OS data element, a network-level data element, a vendor data element, and one or more application-level data elements.

20. The computer-implemented method of claim 14, further comprising: based on the gathered information, performing at least one action of mitigation on the network asset in the computer network to evade a cyber-attack from the source.

* * * * *